United States Patent [19]

Sheppard

[11] 4,198,571
[45] Apr. 15, 1980

[54] SCANNING MICROSCOPES

[75] Inventor: Colin J. R. Sheppard, Headington Quarry, England

[73] Assignee: National Research Development Corporation, London, England

[21] Appl. No.: 899,589

[22] Filed: Apr. 24, 1978

[30] Foreign Application Priority Data

Apr. 28, 1977 [GB] United Kingdom ............... 17826/77

[51] Int. Cl.² ............................................. G01W 21/30
[52] U.S. Cl. ..................................... 250/571; 250/216; 350/12
[58] Field of Search .................. 250/216, 571; 350/12, 350/13

[56] References Cited

U.S. PATENT DOCUMENTS 4,027,973  6/1977  Kaye ............................... 250/57 UX

OTHER PUBLICATIONS

Welford, "Journal of the Optical Society of America," Aug. 1960, pp. 749-753.

Primary Examiner—David C. Nelms
Assistant Examiner—Darwin R. Hostetter
Attorney, Agent, or Firm—Cushman, Darby & Cushman

[57] ABSTRACT

A scanning microscope includes first and second focusing means arranged confocally, at least one focusing means being of annular form, (for example a lens and closely-spaced opaque screen having an annular aperture); coherent radiation detection means arranged to receive radiation from one focusing means; and scanning means to scan an object in the focal plane.

9 Claims, 7 Drawing Figures

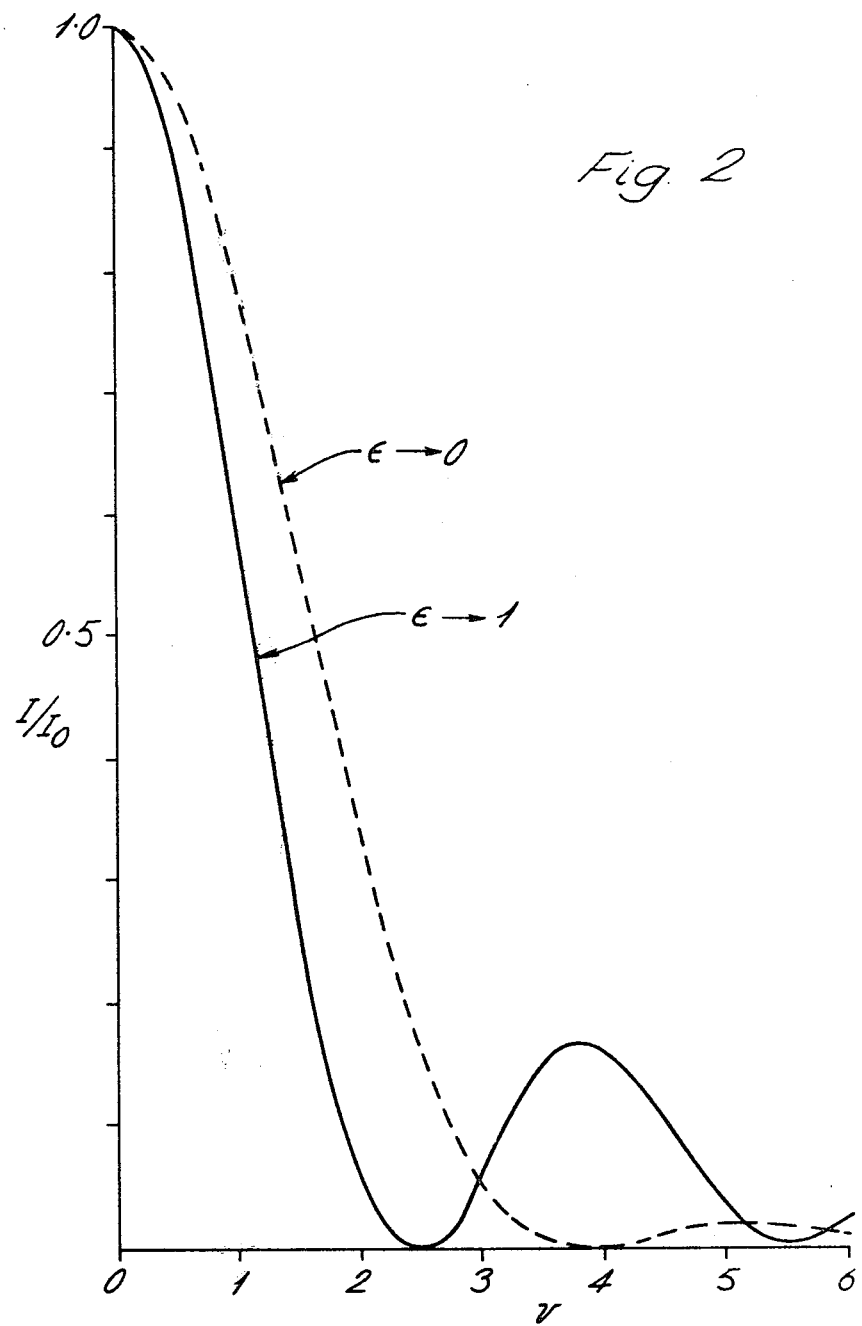

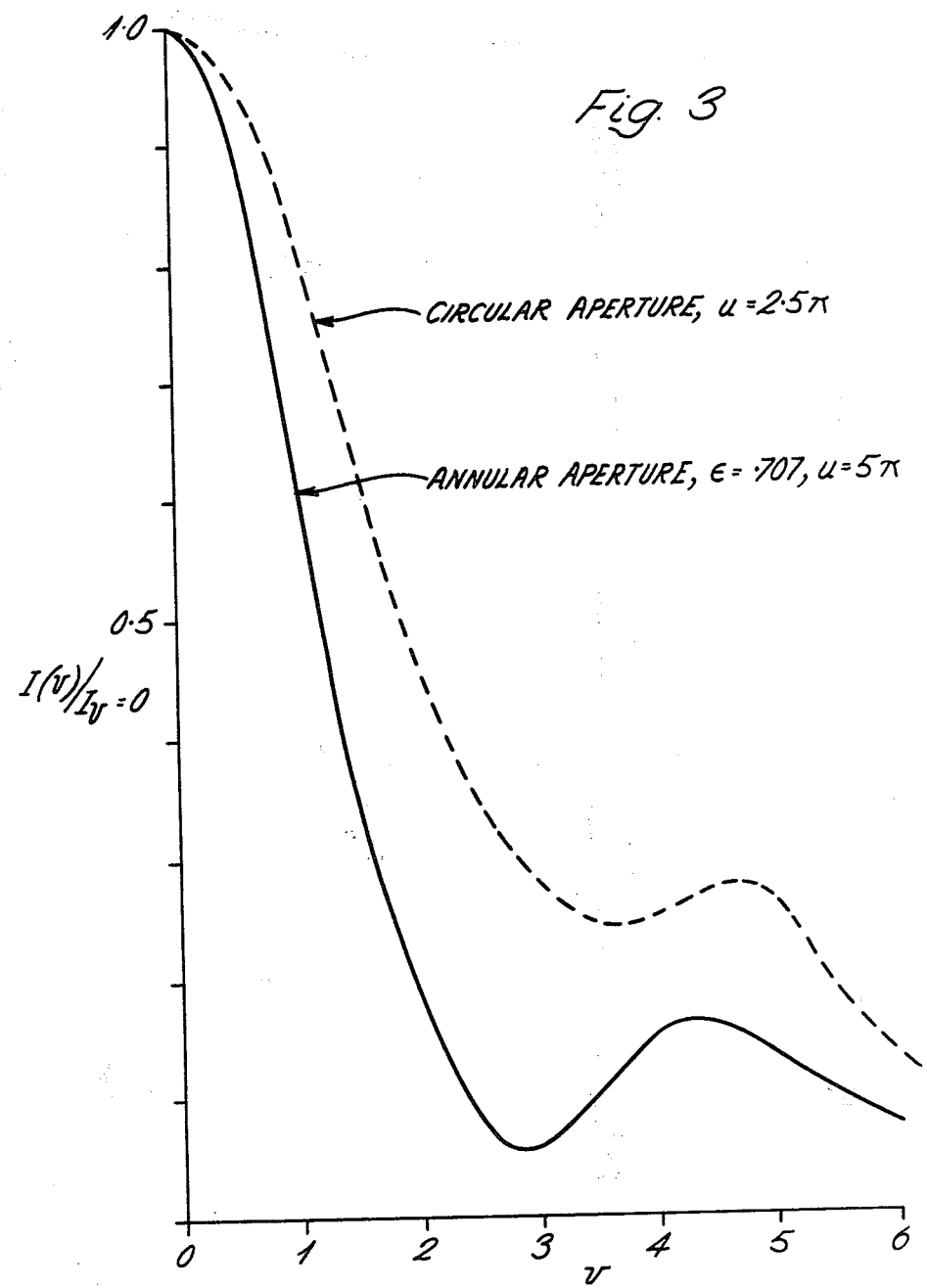

SCANNING MICROSCOPES

This invention relates to improved scanning microscopes.

Scanning microscopes comprise essentially a focusing means to focus radiation from a source on to an object to be viewed, a radiation detector, and scanning means to cause relative movement between the focus and the object. A narrower class of scanning microscopes, which will be referred to as confocal microscopes, comprises a further focusing means to receive radiation from the object and to focus it on to a detector which operates in coherence with a monochromatic source. It is to confocal microscopes that the present invention relates. The radiation may be electromagnetic, as in an optical microscope or may be a beam of electrons or of acoustic radiation.

According to the invention a scanning microscope comprises first and second focusing means arranged confocally, at least one focusing means being of annular form; coherent radiation detection means arranged to receive radiation from the second focusing means, and scanning means arranged to cause relative movement in the focal plane of an object to be viewed and the position of the focus.

The microscope may be an optical microscope and may be either of the reflection or the transmission type and each focusing means may be either one or more lenses or one or more mirrors. The annular focusing device may comprise a lens or lenses or a mirror or mirrors and a closely spaced opaque screen having an annular aperture. Further, the annulus need not be fully transparent but may vary in transparency across the width of the annulus; the variation may, for example, be Gaussian. Alternatively, a focusing means may be used in conjunction with a solid-to-annular beam converter.

Usually the apparatus will further comprise a source of monochromatic radiation such as a laser, which may be used in conjunction with a beam expander.

In a paper in the Journal of the Optical Society of America, 1960, 50, 749, W.T. Welford suggests that the use of a lens in the form of a narrow annulus in a conventional optical microscope results in very poor contrast from extended objects. Similar results would be expected if an annular lens were used in many arrangements of scanning optical microscope, but it is believed that it has not previously been realised that an annular focusing means may be advantageously used in a confocal scanning microscope.

The invention will now be described by way of example with reference to the accompanying drawings in which:

FIG. 2 illustrates the intensity distribution in the region of the focus of an annular lens for two different conditions;

FIG. 3 illustrates the variation in normalised intensity for a normalised distance from the focal plane of 2.5 $\pi/(1-\epsilon^2)$;

Figure 1:
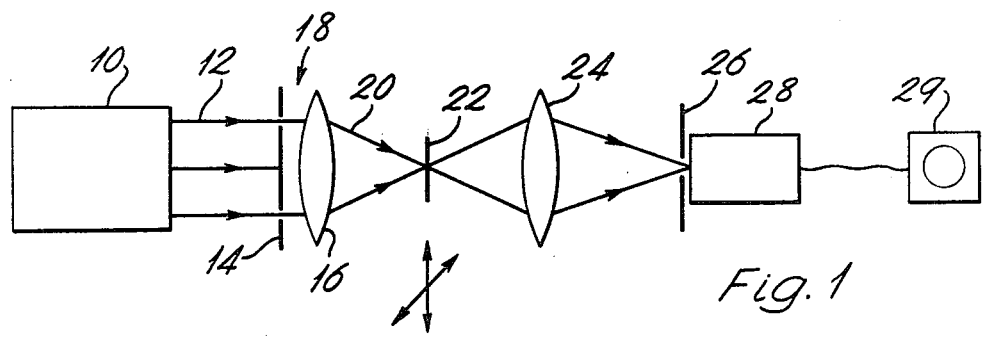
FIG. 1 illustrates schematically one form of transmission scanning optical microscope according to the invention.

In FIG. 1 a helium-neon laser and beam expander 10 provide a collimated beam of radiation 12 which passes through an opaque screen 14 having an aperture in the form of a very narrow annulus and placed close to a convex lens 16, the annular aperture and the lens together comprising an annular lens 18. The lens 18 provides a convergent annular beam 20. An object 22 is placed at the beam focus and can be scanned in two directions perpendicular to the axis of the incident beam, as indicated by the double-headed arrows. A divergent annular beam transmitted through the object passes through a further lens 24 arranged confocally with the annular lens and through a pinhole in a screen 26 to an intensity-sensitive detector such as a photomultiplier 28. The intensity of light sensed by the photomultiplier is used to brightness-modulate a cathode ray tube 29 which is scanned in synchronism with the movement of the object 22, so that a picture of the object is built up.

For a lens with an annular aperture bounded by two concentric circles radii a and $\epsilon a$, normalised co-ordinates u, v can be defined:

$$u = k(a/f)^2 z; \quad v = k(a/f)r \qquad (1)$$

where $k = 2\pi/\lambda$, f is the focal length, z is the axial distance from the focus and r is the radial distance from the axis.

The intensity variation in the focal plane may be written:

$$I(v) = \frac{1}{(1-\epsilon^2)^2} \left[ \frac{2J_1(v)}{v} - \epsilon^2 \left( \frac{2J_1(\epsilon v)}{\epsilon v} \right) \right]^2 I_0 \qquad (2)$$

where $I_0$ is the intensity at the focal point and $J_1$ is a Bessel function of first order.

When $\epsilon \to 0$, this gives the Airy disc, $$I(v) = \frac{4J_1^2(v)I_0}{v^2} \qquad (3)$$

whilst when $\epsilon \to 1$ and the annulus becomes a circular $\delta$-function, the intensity is given by $$I(v) = J_0^2(v)I_0, \qquad (4)$$

where $J_0$ is a zero-order Bessel function.

These two distributions are shown in FIG. 2. It is seen that the normalised radius of the first dark ring is reduced for the thin annulus, in comparison with the circular aperture. However the maximum intensity in the first side-band is increased.

The intensity distribution along the axis of the annular lens has been shown by E. H. Linfoot and E. Wolf, in the Proceedings of the Physical Society, B66, 1953 p.145 to be given by:

$$I(u) = \frac{\sin\frac{1}{4}u(1-\epsilon^2)}{\frac{1}{4}u(1-\epsilon^2)} I_o \qquad (5)$$

It is seen that the axial distribution is expanded by a factor $1/(1-\epsilon^2)$ for the annular aperture, and hence if the depth of focus is defined in terms of the distance from the focal plane for the intensity to drop by a certain factor, the depth of focus is increased. The plots of the intensity distribution in the focal region calculated by Linfoot and Wolf show a tubular structure, the length of which is proportional to $1/(1-\epsilon^2)$. An alternative definition of depth of focus is in terms of the distance from the focal plane for the width of the intensity distribution to be degraded by a certain amount. Careful study of the results of Linfoot and Wolf shows that in this way the depth of focus is improved over and above the factor $1/(1-\epsilon^2)$, as the "wings" of the pattern for the full aperture are absent in that for the annular aperture. FIG. 3 shows the variation in normalised intensity for a distance from the focal plane of $2.5\pi/(1-\epsilon^2)$, that is when the intensity on the optical axis is about 0.2 times that at the focal point. This demonstrates that the first side-band is now lower for the annular lens and that the first minimum is smaller and also nearer the axis.

It has been found that in the optical microscope shown in FIG. 1, the resolution is improved by the annular lens. The calculations of Linfoot and Wolf are valid only sufficiently close to the focal plane for $u/4\pi$ not to be large compared with unity. Further, off-axis aberrations may be increased for annular lenses, but spherical aberration is reduced by a factor of $1/(1-\epsilon^2)$.

Figure 4:
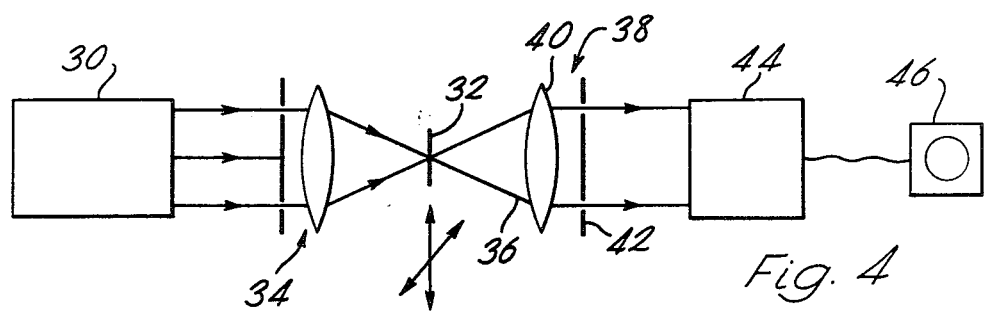
FIG. 4 illustrates an alternative form of transmission scanning optical microscope.

In FIG. 4, a laser and beam expander 30 illuminate an object 32 through an annular lens 34 as in the FIG. 1 arrangement, but the apparatus differs in that the annular beam 36 transmitted by the object is received by an annular collecting lens 38, consisting of a lens 40 and a closely spaced opaque screen 42. The annular beam passing through the annular collecting lens is focussed on and detected by an amplitude-sensitive detector 44 and displayed on the cathode ray tube 46. Since the detector has a plane sensitive surface, the beam is not brought to a point focus, but is focused as a plane wave.

An amplitude-sensitive detector is easily constructed so as to be sensitive to acoustic radiation, but for optical radiation a heterodyning technique may be necessary.

In this arrangement it has been found that the depth of focus of the microscope is improved, considered as a variation either in intensity or in resolution. The annular lenses must be precisely aligned but need not be of the same size; in fact the contrast may be improved if the annuli are of slightly different sizes, and the resolution of some forms of object may also be improved.

It is a requirement in the equivalent arrangements using conventional lenses that both lenses of the microscope are precisely focused on the object. In any arrangement according to the invention, this condition does not apply, because annular lenses have a large depth of focus.

Figure 5:
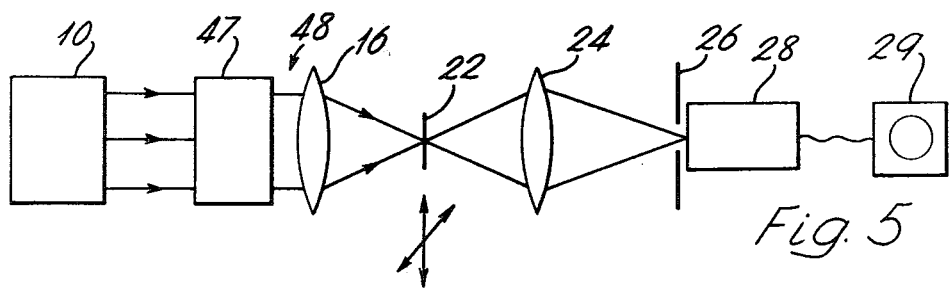
FIG. 5 illustrates apparatus having an alternative annular focusing means.

Inevitably, with a very small annulus, there is a large loss of power, by a factor of $1/(1-\epsilon^2)$ but the use of a sufficiently powerful coherent source, such as a laser, allows useful results to be obtained. The smaller the annuli used, the greater the power loss but the greater the improvement in depth of focus. Power loss could be improved by illuminating the microscope with an annular beam. Such an arrangement is shown in FIG. 5, which is similar to FIG. 1 and in which identical items of apparatus are referenced with the same numerals. The arrangement differs in that the screen 14 is replaced by a solid-to-annular beam converter 47 which converts the incident collimated laser beam to an annular beam, and which in conjunction with the lens 16 constitutes an annular focusing means 48.

A scanning optical microscope according to the invention may have all the advantages of a conventional scanning optical microscope, such as a wide wavelength range, the possibility of varying contrast or magnification electronically, recording phase information, choice of appropriate display system or image storage means etc.

Figure 6:
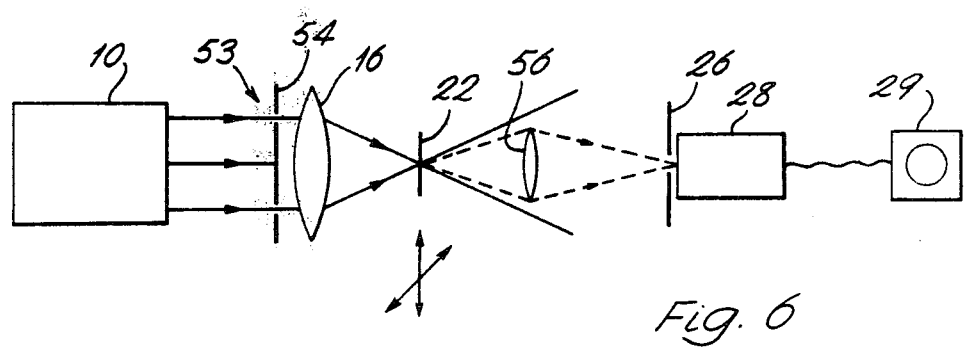
FIG. 6 illustrates a modification to FIG. 1 suitable for dark-field viewing.

A scanning microscope according to the invention can be used in a dark field mode, that is, a mode in which only diffracted light is received by the detector. The FIG. 1 apparatus, modified to show such an arrangement, is illustrated in FIG. 6. The annulus 53 in the screen 54 is arranged to be of slightly larger minimum diameter than the diameter of the other lens 56. As in conventional microscopes, the arrangement can be used to detect small variations in a large signal. If the magnitude of the variation is x then in a conventional microscope the variation in the image is of magnitude proportional to $x^2$, which may be very small; in a scanning microscope according to the invention and having an amplitude detector, (FIG. 4) the variation is proportional to x, and has the further advantage of being linear. With an intensity-sensitive detector (FIGS. 1, 5 and 6) the response may be made linear by taking the square root of the signal.

Figure 7:
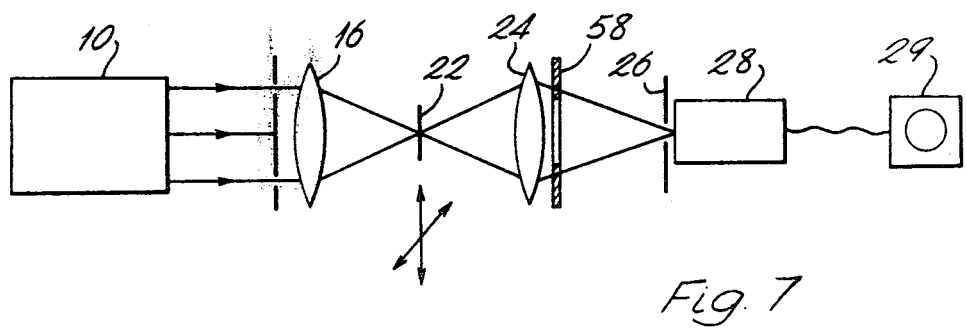
FIG. 7 illustrates another modification to FIG. 1.

Yet another type of arrangement is shown in FIG. 7 in which the technique of phase contrast is used. The apparatus is largely similar to that in FIG. 1, with the addition of a Zernike phase plate placed close to the lens 24 (it can be on either side of the lens); the plate imposes a $\lambda/4$ phase change on radiation passing through the outer annulus, shown shaded, but no phase change occurs in the central region. The relative amplitude transmittances of the annulus and the central region are chosen to give the best contrast at the intensity-sensitive detector 28. With this arrangement, phase changes in the object can be used. The detector could also be an amplitude-sensitive detector.

It is to be understood that the arrangements are to a large extent interchangeable; thus for example the arrangement having two annular lenses can be used with a point detector, or an arrangement having one annular lens can be used with an amplitude-sensitive detector. Further, the annular apertures may be on the opposite sides of the respective lenses to the illustrated arrangements, and dark-field viewing is possible with either of the illustrated types of annular focusing devices.

I claim:

1. Apparatus for use in a scanning microscope comprising first and second focusing means arranged confocally, at least one focusing means being of annular form; coherent radiation detection means arranged to receive radiation from one focusing means; and scanning means arranged to cause relative movement in the focal plane of an object to be viewed and the position of the focus.

2. Apparatus according to claim 1 in which the focusing means of annular form comprises a focusing device and a closely spaced opaque screen having an annular aperture.

3. Apparatus according to claim 2 in which the annular aperture varies in transparency across the width of the annulus.

4. Apparatus according to claim 1 in which the focusing means of annular form comprises a solid-to-annular beam converter and a closely spaced focusing device.

5. Apparatus according to claim 1 further comprising a Zernike phase plate adjacent the focusing means from which the radiation detection means receives radiation.

6. Apparatus according to claim 1 in which only one focusing means is of annular form, in which the minimum diameter of the annulus is greater than the diameter of the other focusing means, and in which the radiation detection means receives radiation from the other focusing means.

7. Apparatus according to claim 1 in which the coherent radiation detection means comprises an intensity-sensitive detector and a closely adjacent pinhole aperture arranged at the focus of one focusing means.

8. Apparatus according to claim 1 in which the coherent radiation detection means comprises an amplitude-sensitive detector arranged to receive plane-wave radiation from one focusing means.

9. A scanning microscope comprising apparatus according to claim 1 and further comprising a laser device arranged to illuminate one focusing means.

* * * * *